United States Patent Office 3,325,516
Patented June 13, 1967

3,325,516
OXIDATION OF HYDROCARBONS
Gordon Cheyne Fettis and Peter James Thomas, both of Runcorn, England, assignors to Imperial Chemical Industries Limited, London, England, a corporation of Great Britain
No Drawing. Filed Nov. 8, 1965, Ser. No. 506,878
Claims priority, application Great Britain, Nov. 13, 1964, 46,340/64; Mar. 15, 1965, 10,765/65
10 Claims (Cl. 260—346.8)

This invention relates to a catalytic process for the manufacture of one or more compounds from the group consisting of maleic acid, maleic anhydride and acrylic acid.

In British specification No. 938,320 there is described a process for the dehydrogenation of a mono-olefin to the corresponding di-olefin by contacting the mono-olefin with oxygen in the vapour phase in the presence of a catalyst comprising an oxygen-containing compound of molybdenum or tungsten promoted with either arsenic, selenium or tellurium. In the said specification it is stated that recommended amounts of oxygen to be passed with the feed stock are between 0.3 and 2.0 moles per mole of olefin reactant; it is also stated that it is preferred to use up to 1 mole of oxygen per mole of mono-olefin.

We have now found that maleic acid (or maleic anhydride) and/or acrylic acid may be obtained when n-butene or butadiene is interacted with oxygen in the vapour phase in the presence of a catalyst containing an oxide of tellurium in admixture or chemical combination with an oxide of molybdenum or tungsten.

The mechanism of the reaction is not understood but it appears that the said products arise, at least in part, from the following sequence of reactions:

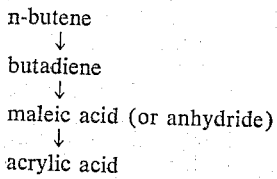

The relative proportions of butadiene, maleic acid (or anhydride) and acrylic acid in the products depend upon the composition of the catalyst and upon the particular reaction conditions, for example the reaction temperature, the contact time and the proportion of oxygen in the reaction mixture.

Thus according to the present invention there is provided a process for the manufacture of one or more unsaturated products from the group consisting of maleic acid, maleic anhydride and acrylic acid which comprises interacting n-butene or butadiene with oxygen in the vapour phase at elevated temperature in the presence of a catalyst containing an oxide of tellurium in admixture or chemical combination with an oxide of molybdenum or tungsten and isolating one or more of the said unsaturated products.

The structure of the catalysts is not clear and a particular catalyst may contain a mixture of the said oxides and/or a chemical compound of molybdenum (or tungsten), tellurium and oxygen.

The catalyst may also contain phosphorus and/or at least one additional multivalent metal other than molybdenum or tungsten. By the term "multivalent metal" is denoted a metal capable of existing in more than one valency state; suitable additional multivalent metals include cobalt and nickel. The catalysts may be made, for example, by mixing aqueous solutions or suspensions of oxides, acids or salts, evaporating the mixture to dryness and calcining the residue. Alternatively, the catalysts may be prepared by mixing the component salts and/or oxides in the dry state. It is preferred to introduce tellurium in the form of tellurium dioxide or in the form of a compound giving rise to tellurium dioxide during preparation or use of the catalyst, for example orthotelluric acid.

When phosphorus is included it may be added, for example, as the oxide or acid; it is especially convenient to dissolve one or more metal oxides in aqueous phosphoric acid and to mix the resultant solution with aqueous orthotelluric acid or with a solution of tellurium dioxide in aqueous hydrochloric acid.

It is preferred to use catalysts containing from 0.01 to 2 gram atoms of tellurium per gram atom of total molybdenum and tungsten.

The total proportion of the additional multivalent metal or metals may be, for example, from 0.5 to 1.5 gram atoms per gram atom of total molybdenum and tungsten, although higher or lower proportions may be used.

The catalyst may be in finely divided form or may be used as granules or pellets, and may be deposited upon a support material, for example a material comprising silica, alumina or titanium oxide. The catalyst may be used in a static bed or in a fluidised bed.

The organic starting material may be substantially pure n-butene or butadiene, or may be a mixture comprising one or more of these compounds. Either of the isomeric forms of n-butene (butene-1 or butene-2) may be used without significant difference in the results.

The mixture of organic starting material and oxygen may be diluted, for example with nitrogen, steam or a mixture thereof.

It is preferred to use from 1 to 10 parts by volume of oxygen for each part by volume of the total butene-1, butene-2 or butadiene. Within this range it is especially preferred to use from 4 to 10 parts by volume of oxygen for each part by volume of the total butene-1, butene-2 or butadiene. The composition of the feed gas may be adjusted as desired so as to avoid inflammability or explosive properties.

The preferred reaction temperatures are those in the range 250° C. to 550° C.

The process is conveniently operated at substantially atmospheric pressure but higher or lower pressures may be used. The maleic anhydride, maleic acid or acrylic acid produced may be isolated from the reaction products by conventional techniques, for example by condensation, scrubbing with water, solvent extraction or combinations of such techniques. Whether maleic anhydride is isolated as such or in the form of maleic acid depends upon the method of isolation of the products; scrubbing with water, or condensation in the presence of steam or water, will favour isolation in the form of maleic acid rather than maleic anhydride.

Butene-1, butene-2, butadiene, maleic anhydride or maleic acid may, if desired, be recycled to the catalyst bed.

Maleic anhydride, maleic acid and acrylic acid may be converted into esters or other compounds of industrial value.

The invention is illustrated but not limited by the following examples. The contact time is calculated from the gas-flow measured at 20° C. and 760 mm. Hg. Yields and conversions are calculated on a molar basis.

Example 1

A catalyst containing 1 gram atom of cobalt and 0.036 gram atom of tellurium per gram atom of molybdenum was prepared as follows:

531 grams of ammonium molybdate were dissolved in 2100 grams of distilled water and the solution was mixed, with stirring, with a solution of 873 grams of cobalt nitrate hexahydrate in 600 grams of distilled water.

240 ml. ammonia (specific gravity 0.88) were mixed with 480 ml. distilled water and added dropwise, with stirring, to the solution containing cobalt and molybdenum. The precipitate was separated by filtration and washed. The resulting wet powder was ball-milled with 17.5 grams of tellurium dioxide, dried and heated in air at 400° C. for 4½ hours.

The catalyst was formed into granules (14–36 B.S.S. mesh) and mixed with twice its own volume of heat-resistant glass particles (5–14 B.S.S. mesh).

A gas mixture consisting of (by volume) 2% "$C_4$ hydrocarbons," 10% oxygen, 50% steam and 38% nitrogen was passed over a portion of the catalyst maintained at 425° C. The "$C_4$ hydrocarbons" were a fraction of the gases obtained by cracking of petroleum and contained (by volume) 92% butene-2 and 4.6% butadiene. The contact time, based on the volume of catalyst used, was 1.5 seconds.

The butene-2 fed was completely consumed and the yield of maleic acid from butene-2 was 30%.

Example 2

A catalyst containing 1 gram atom of nickel, 0.3 gram atom of phosphorus, and 0.1 gram atom of tellurium per gram atom of molybdenum was prepared as follows:

240 ml. of ammonia (specific gravity 0.88) were added at 60° C. to a solution of 528 grams ammonium molybdate in 600 ml. water. To this solution was added a solution of 872 gram nickel nitrate hexahydrate and 58 ml. orthophosphoric acid in 2080 ml. water. The precipitate was separated by filtration and washed. The resulting wet powder was ball-milled with 48 grams tellurium dioxide, dried, and heated in air at 400° C. for 4½ hours.

The catalyst was used to carry out the conversion of butene-2 into maleic acid as described in Example 1. The butene-2 was completely consumed and the yield of maleic acid from butene-2 was 32%.

When the reaction was carried out at 376° C. (contact time 3.0 seconds) the butene-2 was completely consumed, the yield of maleic acid from butene-2 was 28% and the yield of acrylic acid from butene-2 was 7%.

Example 3

A catalyst containing 0.75 gram atom of tellurium and 0.5 gram atom of phosphorus per gram atom of molybdenum was prepared as follows:

148 grams molybdenum trioxide and 5.4 ml. orthophosphoric acid were added to 2200 ml. water and the mixture was stirred at 90° C. for 7 hours. A small residue remained, which was filtered off and washed with water. The washings were combined with the filtrate to give a solution containing phosphorus and molybdenum, the molybdenum content being equivalent to 8.0% (weight/volume) as molybdenum trioxide. To this solution were added 62 grams orthophosphoric acid (88% by weight $H_3PO_4$) and the mixture was evaporated to 900 ml. A solution of 160 grams tellurium dioxide in concentrated hydrochloric acid was added with stirring, followed by 600 grams of titanium dioxide. The mixture was evaporated to dryness and heated in air at 540° C. for 16 hours.

The catalyst was used to carry out the conversion of butene-2 into maleic acid as described in Example 1. The butene-2 was completely consumed and the yield of maleic acid from butene-2 was 28%.

Example 4

A catalyst containing 0.05 gram atom of tellurium and 1 gram atom of nickel per gram atom of molybdenum was prepared as follows:

528 grams of ammonium molybdate were dissolved in 600 ml. water and 250 ml. ammonia (specific gravity 0.88) were added at 60° C. A solution of 872 grams nickel nitrate hexahydrate in 2080 ml. water was added slowly, with stirring. The precipitate was filtered and washed. The resulting wet powder was ball-milled with 18.2 grams tellurium dioxide, dried, and heated in air at 400° C. for 4½ hours.

The catalyst was used to carry out the conversion of butene-2 into maleic acid as described in Example 1, except that the reaction temperature was 385° C.

The butene-2 was completely consumed and the yield of maleic acid from butene-2 was 33%.

Example 5

A catalyst containing 0.1 gram atom of tellurium and 0.5 gram atom of phosphorus per gram atom of molybdenum was prepared as follows:

A solution containing phosphorus and molybdenum (molybdenum content equivalent to 8.0% weight/volume, as molybdenum trioxide) was prepared as described in Example 3. To 748 ml. of this solution was added a solution of 10 grams orthotelluric acid in 20 ml. hot water. The mixture was evaporated to 280 ml. and 18 grams 88% phosphoric acid were added, followed by 280 grams titanium dioxide. The mixture was evaporated to dryness and heated in air at 540° C. for 16 hours.

The catalyst was used to carry out the conversion of butene-2 into maleic acid as described in Example 1. The butene-2 was completely consumed and the yield of maleic acid from butene-2 was 36%.

When the reaction was carried out at 400° C. (contact time 3.0 seconds) the butene-2 was completely consumed, the yield of maleic anhydride from butene-2 was 30% and the yield of acrylic acid from butene-2 was 4%.

Example 6

A catalyst containing 0.35 gram atom of tellurium and 0.5 gram atom of phosphorus per gram atom of molybdenum was prepared as follows:

A solution containing phosphorus and molybdenum (the molybdenum content being equivalent to 8.0% weight/volume as molybdenum trioxide) was prepared as described in Example 3. To 750 ml. of this solution was added a solution of 35 grams orthotelluric acid in hot water. The mixture was evaporated to a volume of 280 ml. and 18 grams of orthophosphoric acid were added. 280 grams of silica gel ("Sorbsil A," 10–100 B.S.S. mesh) were added with stirring and the mixture was evaporated to dryness. The residue was heated in air at 540° C. for 16 hours and used in the form of granules (14–36 B.S.S. mesh), the catalyst being diluted with twice its own volume of glass particles.

A gas mixture consisting of (by volume) 2% "$C_4$ hydrocarbons," 10% oxygen, 38% nitrogen, and 50% steam was passed over a portion of the catalyst at 403° C.

The contact time, calculated from the volume of the catalyst, was 1.5 seconds.

Of the "$C_4$ hydrocarbons" fed, 10% was converted into acrylic acid and 35% was converted into maleic acid.

Example 7

A catalyst containing 0.1 gram atom of tellurium and 0.1 gram atom of phosphorus per gram atom of molybdenum was prepared by a method similar to that described in Example 6.

The catalyst was used as described in Example 6 except that the reaction temperature was 355° C. Of the "$C_4$ hydrocarbons" fed, 10.5% was converted into acrylic acid and 36% was converted into maleic acid.

Example 8

A catalyst containing 0.05 gram atom of tellurium and 0.1 gram atom of phosphorus per gram atom of molybdenum was prepared by a method similar to that described in Example 6.

The catalyst was used as described in Example 6 except that the reaction temperature was 433° C. Of the "$C_4$ hydrocarbons" fed, 8.6% was converted into acrylic acid and 30% was converted into maleic acid.

What we claim is:

1. A process for the manufacture of a compound selected from the group consisting of maleic acid, maleic anhydride and acrylic acid which comprises interacting n-butene with oxygen in the vapour phase at a temperature in the range from 250° to 550° C. in the presence of a catalyst comprising an oxide of tellurium in admixture or chemical combination with an oxide of molybdenum, said catalyst also comprising phosphorus.

2. A process as claimed in claim 1 wherein the catalyst also contains at least one multivalent metal other than molybdenum or tungsten.

3. A process as claimed in claim 2 wherein the multivalent metal is cobalt or nickel.

4. A process as claimed in claim 1 wherein the catalyst contains from 0.01 to 2 gram atoms of tellurium per gram atom of total molybdenum.

5. A process as claimed in claim 1 wherein the catalyst contains from 0.05 to 1.0 gram atom of phosphorus per gram atom of total molybdenum.

6. A process as claimed in claim 2 wherein the catalyst contains from 0.5 to 1.5 gram atoms of said multivalent metal or metals per gram atom of total molybdenum.

7. A process as claimed in claim 1 wherein the catalyst is deposited upon a support material.

8. A process as claimed in claim 1 wherein the reaction mixture contains, as a gaseous diluent, nitrogen steam or a mixture thereof.

9. A process as claimed in claim 1 wherein from 1 to 10 parts by volume of oxygen are employed for each part by volume of total n-butene.

10. A process as claimed in claim 9 wherein from 4 to 10 parts by volume of oxygen are employed for each part by volume of total n-butene.

References Cited

UNITED STATES PATENTS

| | | | |
|---|---|---|---|
| 3,156,706 | 11/1964 | Kerr | 260—346.8 |
| 3,228,890 | 1/1966 | Eden | 260—533 |

NICHOLAS S. RIZZO, *Primary Examiner.*